United States Patent
Morinaga

(10) Patent No.: US 8,293,404 B2
(45) Date of Patent: Oct. 23, 2012

(54) CATALYST STRUCTURE BODY FOR FUEL CELL, MANUFACTURE METHOD THEREFOR, MEMBRANE-ELECTRODE ASSEMBLY, AND FUEL CELL

(75) Inventor: Masahiko Morinaga, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 402 days.

(21) Appl. No.: 12/440,932

(22) PCT Filed: Sep. 11, 2007

(86) PCT No.: PCT/IB2007/002599
§ 371 (c)(1),
(2), (4) Date: Mar. 12, 2009

(87) PCT Pub. No.: WO2008/047191
PCT Pub. Date: Apr. 24, 2008

(65) Prior Publication Data
US 2010/0003571 A1    Jan. 7, 2010

(30) Foreign Application Priority Data
Sep. 14, 2006    (JP) ................... 2006-249423

(51) Int. Cl.
*H01M 4/02*    (2006.01)
*H01M 4/13*    (2010.01)
*H01M 4/80*    (2006.01)
*H01M 4/36*    (2006.01)

(52) U.S. Cl. .................. 429/209; 429/236; 429/523

(58) Field of Classification Search .................. 429/523, 429/209, 236
See application file for complete search history.

(56) References Cited

U.S. PATENT DOCUMENTS

| | | | |
|---|---|---|---|
| 6,746,793 | B1 | 6/2004 | Gyoten et al. |
| 7,255,954 | B2 * | 8/2007 | Hampden-Smith et al. .. 429/483 |
| 2004/0131919 | A1 * | 7/2004 | Yasumoto et al. .............. 429/42 |
| 2004/0197638 | A1 | 10/2004 | McElrath et al. |
| 2006/0105225 | A1 | 5/2006 | Kim et al. |
| 2006/0105226 | A1 | 5/2006 | Kim et al. |

FOREIGN PATENT DOCUMENTS

| | | |
|---|---|---|
| CN | 1305647 | 7/2001 |
| CN | 1816931 | 8/2006 |
| EP | 0 483 085 | 10/1991 |
| EP | 0 874 413 | 10/1998 |

(Continued)

OTHER PUBLICATIONS

Text of the First Office Action for Chinese Application No. 200780034186.0 dated Jul. 19, 2010.

(Continued)

*Primary Examiner* — Patricia L Hailey
(74) *Attorney, Agent, or Firm* — Finnegan, Henderson, Farabow, Garrett & Dunner, LLP

(57) ABSTRACT

A catalyst structure body for a fuel cell includes an agglomerate structure in which agglomerates each formed by aggregation of a catalyst-supporting carbon in which a catalyst is supported on a surface of a carbon have gathered, and a polymer having proton conductivity. The agglomerate structure and the polymer coexist. The polymer has entered pores between the agglomerates in the agglomerate structure. The average thickness of the polymer is set at 3 to 50 nanometers.

20 Claims, 6 Drawing Sheets

FOREIGN PATENT DOCUMENTS

| | | |
|---|---|---|
| EP | 1 693 913 | 8/2006 |
| JP | 2002-22560 | 1/2002 |
| JP | 2002-63912 | 2/2002 |
| JP | 3275652 | 2/2002 |
| JP | 2002-151089 | 5/2002 |
| JP | 2004-281305 | 10/2004 |
| JP | 2005-32668 | 2/2005 |
| JP | 2005-108453 | 4/2005 |
| JP | 2006-164789 | 6/2006 |
| WO | WO 2006/062947 | 6/2006 |

OTHER PUBLICATIONS

Japanese Office Action dated Dec. 2, 2008.

International Search Report and Written Opinion of the ISR.

Y. Aoyama, et al., "Study on Polymer Electrolyte Fuel Cell (V), Influence of Water-Repellant Material in Catalyst Layer," Abstract of Autumn Meeting of the Electrochemical Society, Sep. 5, 1994, p. 257.

M. Uchida, et al, "Study on Polymer Electrolyte Fuel Cell (III), Influence of Organic Solvent on Method of Manufacturing Catalyst Layer," Abstract, $61^{st}$ Meeting of the Electrochemical Society, Mar. 20, 1994, p. 62.

Y. Aoyama, et al., Study on Polymer Electrolyte Fuel Cell (IV), Influence of Water-Repellent Material in Catalyst Layer, Abstract, $61^{st}$ Meeting of the Electrochemical Society, Mar. 20, 1994, p. 62.

* cited by examiner

_US 8,293,404 B2_

CATALYST STRUCTURE BODY FOR FUEL CELL, MANUFACTURE METHOD THEREFOR, MEMBRANE-ELECTRODE ASSEMBLY, AND FUEL CELL

CROSS-REFERENCE TO RELATED APPLICATIONS

This application is a national phase application of International Application No. PCT/IB2007/002599, filed Sep. 11, 2007, and claims the priority of Japanese Application No. 2006-249423, filed Sep. 14, 2006, the contents of both of which are incorporated herein by reference.

FIELD OF THE INVENTION

The invention relates to a catalyst structure body for a solid polymer type fuel cell, a manufacture method therefor, a membrane-electrode assembly, and a fuel cell.

BACKGROUND OF THE INVENTION

Japanese Patent Application Publication No. 2005-32668 (JP-A-2005-32668) discloses a fuel cell catalyst layer made up of a platinum catalyst, an electron conductor made of a carbon black, and a proton-conductive polymer. According to this fuel cell catalyst layer, the proton-conductive polymer is disposed within agglomerates formed by the carbon black and between the agglomerates.

Furthermore, Japanese Patent Application Publication No, 2002-25560 (JP-A-2002-25560) and Japanese Patent Application Publication No. 2002-63912 (JP-A-2002-63912) disclose a catalyst layer that has a carbon particle on which a catalyst metal is supported, and a polymer having proton conductivity. According to this catalyst layer, the polymer has entered pores of agglomerate structures of carbon particles.

Still further, Japanese Patent Application Publication No. 2004-281305 (JP-A-2004-281305) discloses an electrode equipped with a catalyst layer that has a carbon particle having electroconductivity on which a catalyst metal is supported, and a proton-conductive polymer. According to this electrode, the specific surface area of the carbon particle is 200 to 1300 $m^2/g$, and the proton-conductive polymer includes a first proton-conductive polymer whose unit segment size is 5 to 100 nanometers, and a second proton-conductive polymer whose unit segment size is 100 to 1000 nanometers. The large-size second proton-conductive polymer, due to its great molecular chain length and high crystallinity, has a characteristic of being less prone to be swollen by a liquid material, and therefore is expected to restrain the elution of the small-size first proton-conductive polymer.

DISCLOSURE OF THE INVENTION

As the fuel cells, further improvement in the power generation output is desired. It is an object of the invention to provide a catalyst structure body for a fuel cell which is advantageous in further improving the electric power generation output, a manufacture method for the catalyst structure body, and a membrane-electrode assembly as well as a fuel cell.

A first aspect of the invention relates to a catalyst structure body for a fuel cell which has (i) an agglomerate structure in which agglomerates each formed by aggregation of a catalyst-supporting carbon in which a catalyst is supported on a surface of a carbon support have gathered so as to form a pore, and (ii) a proton-conductive polymer that coexists with the agglomerates. The proton-conductive polymer has entered the pore between the agglomerates in the agglomerate structure, and the average thickness the polymer is set at 3 to 50 nanometers.

A second aspect of the invention relates to a membrane-electrode assembly formed by stacking a fuel diffusing element, a fuel catalyst layer, a membrane of a polymer having proton conductivity, an oxidant catalyst layer, and an oxidant diffusing element, sequentially in a thickness direction. At least one of the fuel catalyst layer and the oxidant catalyst layer includes the catalyst structure body for a fuel cell of the first aspect.

A third aspect of the invention relates to a fuel cell that includes: a membrane-electrode assembly formed by stacking a fuel diffusing element, a fuel catalyst layer, a membrane formed from a polymer having proton conductivity, an oxidant catalyst layer, and an oxidant diffusing element, sequentially in an average thickness direction; a fuel distributing element disposed facing the fuel diffusing element of the membrane-electrode assembly; and an oxidant distributing element disposed facing the oxidant diffusing element of the membrane electrode assembly. At least one of the fuel catalyst layer and the oxidant catalyst layer includes the catalyst structure body for a fuel cell according to any one of the foregoing aspects of the invention.

According to the foregoing aspects, the polymer having proton conductivity (electrolyte) has entered the pore between agglomerates, and is attached to the agglomerates. If the average thickness of the polymer having proton conductivity is excessively large, the space of each pore becomes small, thus making likely the occurrence of a fault, such as decline in the passage characteristic of a reactant fluid involved in the electric power generation reaction (fuel or an oxidant fluid), or decline in the water discharge characteristic. Therefore, there is possibility of decline in the electric power generation output of the fuel cell. On the other hand, if the average thickness of the polymer is excessively small, there is possibility of occurrence of rupture of the polymer. Therefore, a fault in which good proton conductivity is not obtained is likely to occur, and there is a possibility of decline in the power generation output of the fuel cell. If the average thickness of the polymer is within the aforementioned range, occurrence of the aforementioned faults is restrained, and a power generation output of the fuel cell is maintained.

The average thickness of the proton-conductive polymer may be found as in the following expression: the average thickness t=the volume of the proton-conductive polymer/ (the total surface area of the carbon support $\times \alpha$). In this expression, a means an attachment coefficient that represents a proportion of the proton-conductive polymer attaching to the entire surface area of the carbon support. If $\alpha$ is 1, it means that the polymer is attached to the entire surface area of a carbon particulate body. The attachment coefficient $\alpha$ may be a value in the range of 0.2 to 0.7, or $\alpha$ value in the range of 0.3 to 0.6.

A fourth aspect of the invention relates to a manufacture method for a catalyst structure body for a fuel cell. This manufacture method includes: the mixture forming step of forming a mixture whose main components are a catalyst-supporting carbon in which a catalyst is supported on a surface of a carbon, a proton-conductive polymer, and a liquid material; and the ultrasonic stirring step of executing each of an ultrasonic operation of applying ultrasonic vibration to the mixture, a cooling operation of cooling the mixture, and a stirring operation of stirring the mixture, at least once respectively for each operation. In this case, since the pulverization characteristic of the agglomerates is good, the size of the pore in the agglomerate structure and the thickness of the polymer present on the pore can easily be set at a good value. In addition, in the ultrasonic stirring step, the sequence of the ultrasonic operation, the cooling operation and the stirring operation is arbitrary.

A fifth aspect of the invention relates to a manufacture method for a catalyst layer for a fuel cell. The method includes: the step of forming a coating material that contains a catalyst structure body manufactured by the manufacture method according to the fourth aspect of the invention; the step of forming a coating layer by coating the coating material to a surface of a membrane or a diffusing element (a fuel diffusing element or an oxidant diffusing element); and the step of drying the coating layer. In order to allow the catalyst utilization rate to be heightened, the amount of the catalyst per unit area (1 $cm^2$) of the catalyst layer may be set relatively low, that is, at 0.01 to 0.45 $mg/cm^2$ and, particularly, at 0.04 to 0.36 $mg/cm^2$.

According to the invention, it is possible to provide a catalyst structure body for a fuel cell, a membrane-electrode assembly, and a fuel cell that are advantageous in further improving the electric power generation output.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EMBODIMENTS

Figure 1:
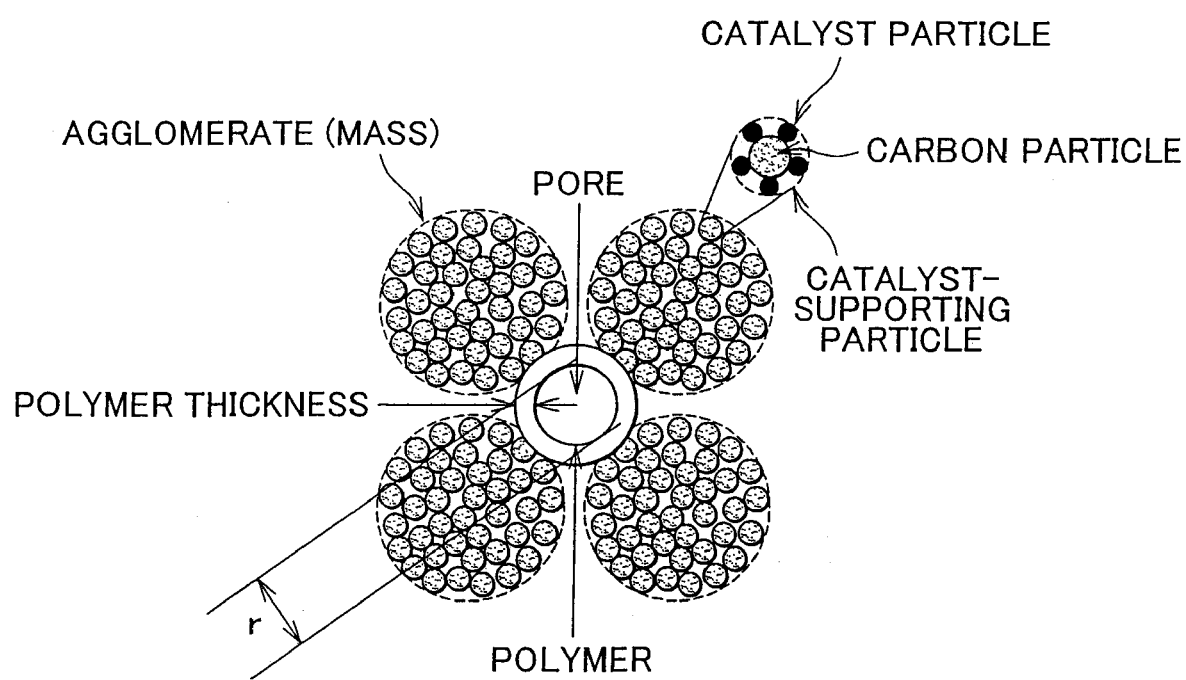
FIG. 1 is a diagram showing a concept of a catalyst structure body for a fuel cell.

A catalyst structure body for a fuel cell has (i) an agglomerate structure formed by the gathering of agglomerates each formed by aggregation of a catalyst-supporting carbon in which a catalyst is supported on a surface of a carbon support present in a fine particle state (small-size electroconductivity material), and (ii) a polymer having proton conductivity, which coexist. The carbon support is excellent in electroconductivity and corrosion resistance. The carbon support used in the invention may be, for example, carbon black, and carbon nanotube (including carbon nanohorn). The carbon black may be, for example, acetylene black, Ketjen black, furnace black and Vulcan.

The catalyst may be, for example, at least one of platinum, rhodium, palladium, ruthenium, etc.

The agglomerate is a cluster formed by aggregation of a plurality of catalyst-supporting carbon particles. A plurality of agglomerates gather to form an agglomerate structure. The catalyst-supporting carbon is formed by supporting the catalyst on a surface of the particle-like or fiber-like carbon support. The specific surface area of the carbon support (in a state without the catalyst) is not particularly limited, and, for example, may be 10 to 2500 $m^2/g$, or 10 to 2000 $m^2/g$, and particularly 120 to 600 $m^2/g$, or 30 to 100 $m^2/g$.

The polymer having proton conductivity (electrolyte) may be formed from a macromolecular material that has a proton-conducting group. The proton-conducting group may be, for example, a sulfonic acid group, a phosphonic acid group, and a phosphoric acid group. The polymer (electrolyte) may be a fluorocarbon-based polymer, or may also be a hydrocarbon-based polymer. The fluorocarbon-based polymer may be, for example, polymers whose main chain is one of polytetrafluoroethylene, polyhexafluoropropylene, tetrafluoro-hexafluoropropylene copolymer, etc. The hydrocarbon-based polymer may be, for example, polymers whose main chain is one of polyolefin, polyether ketone, polyimide, polybenzimidazole, etc. The side chains thereof may be, for example, alkyl groups, alkyl ether groups, styrene groups. Specifically, the polymer may be, for example, a perfluorosulfonic acid resin (Nafion). As for the polymer having proton conductivity, the molecular weight is, for example, 10 thousand or more and 800 thousand or less.

The aforementioned polymer attaches to agglomerates (clusters of aggregated catalyst-supporting carbon particles), and enters a pore in a agglomerate structure), an average thickness of the polymer is 3 to 50 nanometers. Therefore, good proton conductivity in the pores is secured. Incidentally, in this specification, the term "pore diameter" means average pore diameter even when the word "average" is not explicitly stated. Likewise, the term "thickness" means average thickness even when the word "average" is not explicitly stated.

It is to be noted herein that if the thickness of the polymer attaching to a wall that defines a pore is thin, the membrane of the proton conductivity polymer easily ruptures, and therefore there is possibility of decline in the proton conductivity thereof. If the thickness of the polymer attaching to a wall that defines a pore is thick, the space of the pore becomes correspondingly small, so that there is possibility of decline in the passage characteristic of a reactant fluid (fuel or oxidant fluid) and in the water discharge characteristic. Taking these circumstances into account, the thickness of the polymer may be 4 to 40 nanometers, or 4 to 20 nanometers, or 5 to 11 nanometers, or 6 to 10 nanometers, although it varies depending on the size of agglomerates, the size of pores, etc.

A further description will be given. In the case where the pore diameter is large, a degree of the passage characteristic of the reactant fluid in the pores is secured, as compared with the case where the pore diameter is small. Therefore, in the case where the pore diameter is large, even if the thickness of the polymer attaching to a wall that defines a pore is increased, a degree of the passage characteristic of a reactant fluid and a degree of the water discharge characteristic are secured, and the decline in the power generation output is lessened. On the other hand, in the case where the pore diameter is small, the passage characteristic of a reactant fluid through the pore is small, and on the oxidant electrode, there is possibility of decline in the characteristic of discharging reaction-produced water, which may induce flooding, and cause a decline in the power generation output. The "flooding" means decline in the flow characteristic of a reactant fluid caused by water clogging. Taking these circumstances into account, the upper limit value of the thickness of the polymer disposed between agglomerates may be, for example, 30 nanometers, 20 nanometers, 15 nanometers or 10 nanometers, and may also be, for example, 8 nanometers, 6 nanometers, or the like. The lower limit value that can be adopted in combination with the aforementioned upper limit value may be, for example, 3 nanometers or 4 nanometers, and may also be, for example, 5 nanometers, 6 nanometers, or the like. However, the upper limit value and the lower limit value are not limited to the aforementioned values.

If the size of agglomerates is large so that the average pore diameter of an agglomerate structure is excessively large, there is heightened probability that, of the entire amount of the catalyst supported on the carbon supports that constitute each agglomerate, the amount of the catalyst that is less prone to contribute to the power generation reaction increases. Therefore, there is possibility of decline in the catalyst utilization rate. Taking the aforementioned circumstances into account, the pore diameter of the agglomerate structure that includes agglomerates (in a polymer attached state) may be, for example, set at about 40 to 350 nanometers.

The average pore diameter of the agglomerate structure may be, for example, 50 to 300 nanometers, 50 to 250 nanometers, or 50 to 220 nanometers, and may also be, for example, 60 to 150 nanometers, or 80 to 120 nanometers. Therefore, as for the pore diameter of the agglomerate structure, the upper limit value thereof may be, for example, 300 nanometers, 250 nanometers, 200 nanometers, 100 nanometers, or the like. The lower limit value that can be adopted in combination with the aforementioned upper limit value may be, for example, 50 nanometers or 60 nanometers, and may also be, for example, 70 nanometers, 85 nanometers, 120 nanometers, or the like. In addition, the size of the agglomerates affects the pore diameter of the agglomerate structure. If the agglomerate size is large, the pore diameter becomes large. If the agglomerate size is small, the pore diameter becomes small.

The catalyst structure body for a fuel cell in accordance with an embodiment of the invention may be, for example, a form that is formed by (i) forming a mixture whose main components are a catalyst-supporting carbon in which a catalyst is supported on a carbon surface, a polymer, and a liquid material, and then (ii) executing each of an ultrasonic operation of applying ultrasonic vibration to the mixture, a cooling operation of cooling the mixture, and a stirring operation of stirring the mixture, at least once respectively for each operation. The liquid material may be an aqueous material and/or an organic material. The organic material may be, for example, an alcohol or the like, a ketone, an ester, etc. The alcohol or the like may be, for example, ethanol, methanol, propanol (1-propanol, or the like), isopropyl alcohol, butyl alcohol, etc. In accordance with need, a water repellent, a pore forming agent for forming pores or a viscosity enhancer for adjusting the viscosity of the mixture may be added to the mixture.

The aforementioned ultrasonic operation pulverizes oversize agglomerates. The frequency of the ultrasonic wave in the ultrasonic operation is selected as appropriate, and may be, for example, about 5 kHz to 200 kHz, and particularly, may also be about 5 kHz to 68 kHz, or about 15 kHz to 48 kHz. However, the frequency of the ultrasonic wave is not limited to these values. The execution of the ultrasonic operation of applying ultrasonic vibration to the mixture has possibility that the temperature of the mixture rises and the degradation of the polymer or the catalyst may be accelerated. In this case, it is preferable to execute the cooling operation of cooling the mixture after executing the ultrasonic operation of applying ultrasonic vibration to the mixture. Stirring means for stirring the mixture may be a stirrer, a mixer, etc. As for the rotation speed of the stirring operation, the higher it is, the higher the stirring characteristics becomes, and the more uniform dispersion is achieved. However, if the rotation speed of the stirring operation is high, there is possibility of the mixture flying out of the container. Taking these circumstances into account, the rotation speed in the stirring operation may be, for example, about 20 to 2000 rpm, and particularly, about 150 to 800 rpm. However, the rotation speed in the stirring operation is not limited to these values.

In the cooling operation, it is preferable that the container housing the mixture be cooled by a coolant. The coolant may be, for example, ice, dry ice or the like, or may also be water with ice, dry ice or the like. The cooling temperature adopted may be 0° C. or higher, or 5° C. or higher. If the cooling temperature is below 0° C., there is possibility that the mixture may freeze and the change to a solid phase may excessively progress. The ultrasonic operation, the cooling operation and the stirring operation may be carried out in that order. Furthermore, the three operations may also be carried out in the order of the ultrasonic operation, the stirring operation, the cooling operation. Furthermore, they may also be carried out in the order of the stirring operation, the ultrasonic operation and the cooling operation.

Where the operation time of the ultrasonic operation is Ts and the operation time of the cooling operation is Tc and the operation time of the stirring operation is Tr, the relationship among these operation times may be, for example, Ts<Tc and Ts<Tr, or Ts>Tc and Ts>Tr. However, the relationship among these amounts of operation time is not limited to the aforementioned relationships. Ts may be set at about 30 seconds to about 3 minutes, or about 40 seconds to about 2 minutes. Tc may be set at about 1 to about 10 minutes, or about 2 to about 7 minutes. Tr may be set a, for example, about 1 minute to about 10 minutes, or about 2 minutes to about 7 minutes. However, Ts, Tc and Tr are not limited to these values.

Where the execution of the ultrasonic operation, the cooling operation and the stirring operation is defined as one cycle (the sequence thereof is arbitrary), it is possible to execute, for example, 2 to 70 cycles. It is also possible to execute 2 to 50 cycles, or 2 to 30 cycles. If the number of cycles executed is small, the pore diameter in the agglomerate structure becomes large. If the number of cycles executed is large, the pore diameter in the agglomerate structure becomes small. For example, if the number of cycles executed is about 25 to about 35, the pore diameter is likely to be approximately 60 to 140 nanometers, or 80 to 120 nanometers. If the number of cycles executed is approximately 2 to 7, the pore diameter is likely to be approximately 150 to 250 nanometers, or 180 to 220 nanometers.

In the mixture, the mixing ratio may be set in mass ratio as follows, although it varies depending on the targeted pore size, or the like.
Catalyst: 0.1 to 0.7, and particularly 0.3 to 0.6
Carbon support: 0.3 to 0.9, and particularly 0.4 to 0.8
Polymer: 0.1 to 0.8, and particularly 0.4 to 0.7
Water: 5 to 15, and particularly 6 to 11
Alcohol or the like: 1 to 12, and particularly 2 to 7

As mentioned above, the execution of the ultrasonic operation, the cooling operation and the stirring operation forms pores between agglomerates. Furthermore, the execution thereof can cause the polymer to enter the interiors of pores in an agglomerate structure while causing the polymer to attach to the agglomerates. Incidentally, where the pore diameter or a pore (pore diameter in the state in which the polymer is attached to the wall that defines the pore) formed between agglomerates is D and the thickness of the polymer is t, the amount of time of execution and the number of times of execution of each of the ultrasonic operation, the cooling operation and the stirring operation affect the pore diameter D and the thickness t of the polymer, depending on the kind of the carbon, the size thereof, etc.

A membrane-electrode assembly is formed by stacking a fuel diffusing element that diffuses a fuel, a fuel catalyst layer that contains a catalyst, a membrane formed of a polymer, an oxidant catalyst layer that contains a catalyst, and an oxidant diffusing element that diffuses an oxidant, sequentially in the thickness direction. Herein, at least one of the fuel catalyst layer and the oxidant catalyst layer includes above-described catalyst structure bodies. The membrane can be formed proton conductivity polymer. The polymer may be a fluorocarbon-based macromolecular material, or may also be a hydrocarbon macromolecular material. Concretely, the polymer may be, for example, a perfluorosulfonic acid resin (Nafion).

The fuel catalyst layer can be formed by forming an ink that contains above-described catalyst structure bodies, and coating the ink to a surface of the oxidant diffusing element (or to the membrane formed by the polymer) by coating means. Likewise, the oxidant catalyst layer can be formed by coating the ink that contains above-described catalyst structure bodies to the fuel diffusing element (or to the membrane formed by the polymer) by the coating means. The coating means may be, for example, a known method such as the doctor blade method, the screen printing method, the gravure coating method, the spray coating method, etc. It is preferable to perform a drying process after coating the ink.

The fuel diffusing element has fluid passage characteristic, gas diffusivity, porosity and electroconductivity. The oxidant diffusing layer has fluid passage characteristic, porosity and electroconductivity. The fuel diffusing element and the oxidant diffusing layer can be formed from a carbon-based or metal-based material that has porosity. The carbon-based material may be, for example, a carbon paper or a carbon cloth, each of which is a carbon fiber-integrated body. The fuel may be gaseous fuel or liquid fuel, and may be, for example, hydrogen gas, a hydrogen-containing gas, methanol, ethanol, dimethyl ether, etc. The oxidant may be, for example, air, a gas containing oxygen gas, and an oxygen gas.

A fuel cell in accordance with the invention includes (i) a membrane-electrode assembly formed by stacking a fuel diffusing element, a fuel catalyst layer, a membrane formed from a polymer that has proton conductivity, an oxidant catalyst layer, and an oxidant diffusing element, sequentially in a thickness direction, (ii) a fuel distributing element disposed facing the fuel diffusing element of the membrane-electrode assembly, and (iii) an oxidant distributing element disposed facing the oxidant diffusing element of the membrane electrode assembly.

At least one of the fuel catalyst layer and the oxidant catalyst layer includes above-described catalyst structure bodies. The fuel distributing element is disposed on an outer side the fuel diffusing element of the membrane-electrode assembly, and supplies the fuel to the fuel diffusing element, and is usually called separator. The oxidant distributing element is disposed on an outer side the oxidant diffusing element of the membrane-electrode assembly, and supplies the oxidant fluid to the oxidant diffusing element, and is usually called a separator. The fuel diffusing element and the oxidant diffusing element can each be formed from a carbon-based material, or a metal-based material having high-corrosion resistance (e.g., an alloy steel, such as a stainless steel, or the like, a metal with plated coating).

Where in the membrane-electrode assembly and the fuel cell described above, the pore diameter of the catalyst structure bodies in the fuel catalyst layer is Da and the pore diameter of the catalyst structure bodies in the oxidant catalyst layer is Dc, any one of the relationships Da=Dc, Da≈Dc (Da/Dc=0.9 to 1.1) and Da<Dc may hold. If the relationship Da=Dc or Da≈Dc holds, the fuel catalyst layer and the oxidant catalyst layer can be made identical, that is, provided as common component parts. Therefore, the embodiment is advantageous in cost reduction. Due to the electric power generation reaction, water is produced in the oxidant catalyst layer. If the relationship Da<Dc holds, the produced water discharge characteristic of the oxidant catalyst layer can be heightened. The thickness of the polymer in the pore may be set so that ta=tc or ta≈tc (ta/tc=0.9 to 1.1) where ta is the thickness of the polymer in the fuel catalyst layer and tc is the thickness of the polymer in the oxidant catalyst layer. Besides, corresponding to Da<Dc, ta<tc may be set.

Embodiment 1

Hereinafter, Embodiment 1 of the invention will be described with reference to FIGS. 1 to 10. This embodiment is intended to secure a power generation output of a fuel cell while reducing the amount of catalyst used. FIG. 1 schematically shows a concept of catalyst structure bodies used in a catalyst layer of a fuel cell. As shown in FIG. 1, a catalyst structure body has an agglomerate structure in which agglomerates have gathered, and a polymer (electrolyte), which coexist. FIG. 1 is a conceptual diagram schematically showing a portion of the agglomerate structure. In reality, agglomerate structures as shown in FIG. 1 gather three-dimensionally to form a catalyst structure body.

An agglomerate is a cluster (secondary particle) formed by aggregation of many catalyst-supporting carbons. Each catalyst-supporting carbon is formed by loading the surface of a primary particle of carbon with catalyst. The specific surface area of the carbon particles is 10 to 2000 $m^2/g$. The primary particle size of the carbon particles is set at 5 to 150 nanometers. The catalyst is a particle of platinum (average particle diameter: 0.5 to 50 nanometers). In addition, since FIG. 1 is a conceptual diagram, each agglomerate is shown as a state in which primary particles of carbon are spherically aggregated. In reality, however, agglomerates sometimes have different shapes.

A polymer having proton conductivity is formed of a perfluorosulfonic acid resin (Nafion). In the agglomerate structure, the polymer attaches to peripheries of agglomerates, and enters the interior of the pore of the agglomerate structure. In a state where the polymer has entered the pore of the agglomerate structure, the pore diameter of the agglomerate structure is set within the range of 40 to 350 nanometers. The thickness of the polymer present in the pore present of the agglomerate structure is set in the range of 3 to 50 nanometers. In the state in which the polymer enters the interior of the pore of the agglomerate structure, the pore diameter of the agglomerate structure is indicated by "r" in FIG. 1.

Since carbon particles often have on their surfaces functional groups such as carboxyl groups, hydroxyl groups or the like, the polymer is likely to attach to the agglomerates. However, since the pore of each agglomerate structure is very small, it is not always the case that the polymer has entered the interior of the pore of each agglomerate structure.

Therefore, according to this embodiment, the following operation is performed in order to achieve a heightened degree of good entrance of the polymer into the pores of each agglomerate structure as well as good coverage of the surroundings of agglomerate structure. Since FIG. 1 is a mere conceptual diagram, the membrane of the polymer present within the pore of the agglomerate structure is schematically shown. Actually, however, the membrane of the polymer is present on the outer peripheries of the agglomerate structure as well.

To perform manufacture, firstly, a catalyst-supporting carbon in which catalyst is supported on surfaces of carbon particles, the polymer, and the liquid material are prepared. Then, a mixture having fluidity that contains the catalyst-supporting carbon, the polymer and the liquid material as main components is formed in a container (beaker). As the liquid material, water and alcohol are adopted. As the alcohol, a propanol (1-propanol, or the like) is adopted.

With regard to the aforementioned mixture, the mixing ratio is set in mass ratio as follows.
Catalyst (platinum): 0.4
Carbon particle: 0.6
Polymer (Nafion): 0.66
Water: 8
Alcohol or the like (1-propanol): 4

After that, using an ultrasonic homogenizer (Model: viracell, by SONIC Kabushiki Kaisha), the ultrasonic operation of applying ultrasonic vibration to the mixture, the cooling operation of cooling the mixture, and the stirring operation of stirring the mixture are executed an appropriate number of times in that order. By executing the ultrasonic operation, oversize agglomerates, if any, are pulverized in a good manner. The frequency of ultrasonic wave in the ultrasonic operation is appropriately selected, and a frequency of about 15 kHz to 48 kHz is adopted in this embodiment. However, this is not restrictive.

If the ultrasonic operation of applying ultrasonic vibration to the mixture is executed, the temperature of the mixture rises, leading to a possibility of accelerating the degradation of the polymer or the catalyst. Therefore, after the ultrasonic operation of applying ultrasonic vibration to the mixture is executed, the cooling operation of cooling the mixture is executed. As for the rotation speed in the stirring operation of stirring the mixture, a speed of 50 to 1000 rpm and, in particular, about 150 to 800 rpm is adopted. In the cooling operation, the container (beaker) containing the mixture is cooled to a cooled temperature (in the range of 0 to 40° C.) by causing the container to contact a coolant. As the coolant, a water having ice is adopted. If the mixture is cooled to less than 0° C., there arises a possibility of the freezing of water in the mixture and excessive progress of solidification, and therefore such cooling is not preferable.

Herein, where the operation time of the ultrasonic operation is Ts and the operation time of the cooling operation is Tc and the operation time of the stirring operation is Tr, a relationship of Ts<Tc and Ts<Tr is adopted in this embodiment. Herein, Ts is set at about 1 minute. Tc is set at about 5 minutes. Tr is set at about 5 minutes.

According to this embodiment, 2 to 100 cycles of the operations, that is, the ultrasonic operation, the cooling operation and the stirring operation, which make one cycle (the sequence of the operations is arbitrary), are executed, and particularly, 2 to 50 cycles thereof are executed. If the number of cycles thereof is small, the number of times of execution of the ultrasonic operation and the stirring operation becomes small, giving rise to a tendency toward larger sizes of the agglomerates, and toward larger pore diameters in the agglomerate structure. On the other hand, if the number of cycles is large, the number of times of execution of the ultrasonic operation and the stirring operation becomes large and the degree of pulverization of agglomerates increases, so that there arises a tendency toward smaller sizes of the agglomerates and toward smaller pore diameters in the agglomerate structure. For example, if the number of cycles is about 25 to 35, the pore diameter is likely to be about 60 to 140 nanometers, or about 80 to 120 nanometers. If the number of cycles is about 2 to 7, the pore diameter is likely to be about 150 to 250 nanometers, or about 180 to 220 nanometers.

As mentioned above, large pore diameters correspond to large sizes of the agglomerates. Small pore diameters correspond to small sizes of the agglomerates. If the size of the agglomerates is large (if the pore diameter is large), the catalyst on inner sides of the agglomerates becomes less likely to be utilized for the electric power generation reaction (due to a reactant gas is less prone to permeate), and the catalyst utilization rate declines. On the other hand, if the size of the agglomerates is small (if the pore diameter is small), the utilization rate of the catalyst supported on the carbon particles that constitute the agglomerates becomes high. According to a calculation, when the pore diameter is 65 nanometers, the catalyst utilization rate is 26%. However, when the pore diameter is 240 nanometers, the catalyst utilization rate declines to 20%. Herein, the catalyst utilization rate can be expressed by Sr/Sa, where Sr is the surface area of the catalyst actually used in the electric power generation reaction and Sa is the catalyst surface area of the catalyst-supporting carbon. The surface area Sr of the catalyst can be found as follows. That is, the surface area Sr can be measured by a method such as the cyclic voltammetry method or the like. In this case, when hydrogen is caused to flow to the fuel electrode side and nitrogen is caused to flow to the oxidant electrode side, a hydrogen ion adsorption/desorption wave occurs in the catalyst layer on the oxidant electrode. By detecting the hydrogen ion adsorption/desorption wave, the reaction active area Sr of the catalyst is measured.

Incidentally, as mentioned above, if the ultrasonic operation, the cooling operation and the stirring operation are repeatedly executed, the agglomerates become smaller, and pores are formed between agglomerates. Furthermore, the polymer can be caused to enter the interiors of the pores in a good manner. Herein, the amount of execution time and the number of times of execution of the ultrasonic operation, the cooling operation and the stirring operation affect the pore diameter D of the pores formed between agglomerates, and the thickness t of the polymer, depending on the kind and size of the carbon particles, or the like.

According to the embodiment, the supported catalyst concentration is set in the range of 18 to 80% by mass provided that the mass of the catalyst-supporting carbon in which the catalyst is supported on the carbon particle is defined as being 100%. Besides, the amount of the catalyst per unit area ($cm^2$) in the catalyst layer is set in the range of 0.1 to 0.4 $mg/cm^2$.

Figure 2:
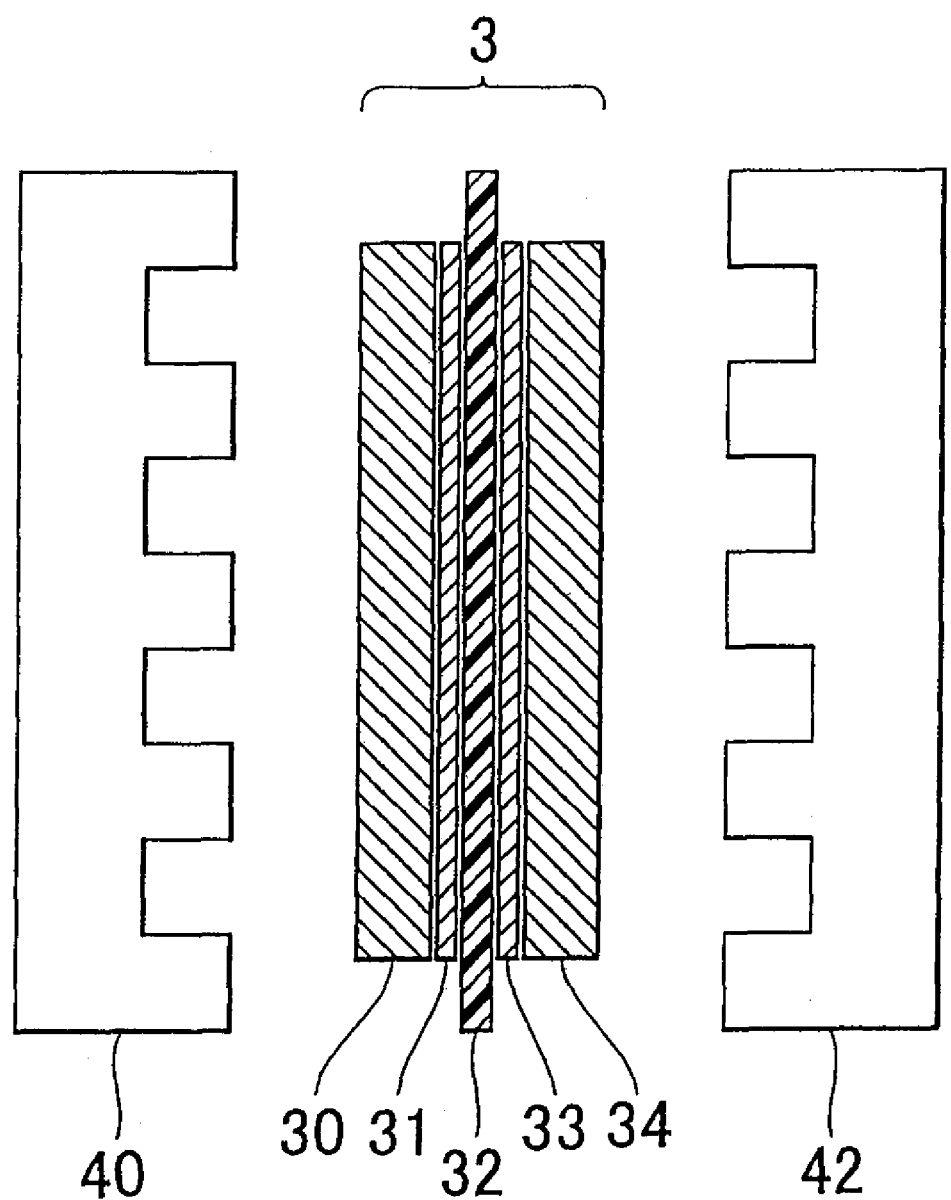
FIG. 2 is a diagram showing the concept of a fuel cell.

FIG. 2 schematically shows a concept of a membrane-electrode assembly 3 (hereinafter, also referred to as "MEA") in accordance with the embodiment. The MEA 3 is formed by stacking a fuel diffusing element 30 (about 250 micrometers in thickness), a fuel catalyst layer 31 (about 15 micrometers in thickness), a membrane 32 (about 50 micrometers in thickness) formed of the polymer, an oxidant catalyst layer 33 (about 15 micrometers in thickness), and an oxidant diffusing element 34 (about 250 micrometers in thickness) sequentially in the thickness direction.

The fuel catalyst layer 31 and the oxidant catalyst layer 33 are formed as follows. That is, an ink that contains catalyst structure bodies described above (a coating material having fluidity) is formed. The ink is coated onto a surface of the oxidant diffusing element 34 to a thickness of about 15 micrometers by coating means (the doctor blade method) so as to form a coating layer. After that, in an atmospheric atmosphere, the coating layer is dried at about 70 to 90° C. for 5 to 15 minutes. In this manner, the fuel catalyst layer 31 and the oxidant catalyst layer 33 are formed.

The fuel diffusing element 30 is in a sheet form, and has fluid passage characteristic, porosity and electroconductivity. The oxidant diffusing element 34 is in a sheet form, and has fluid passage characteristic, porosity and electroconductivity. The fuel diffusing element 30 and the oxidant diffusing element 34 are made of a carbon-based material. Concretely, the carbon-based material adopted is a sheet-form carbon cloth (a cluster of carbon fibers).

FIG. 2 shows an exploded view of a fuel cell. As shown in FIG. 2, the fuel cell includes an MEA 3, a fuel distributing element 40 disposed facing the fuel diffusing element 30 of the MEA 3, and an oxidant distributing element 42 disposed facing the oxidant diffusing element 34 of the MEA 3. The fuel distributing element 40 is deposed on an outer side of the fuel diffusing element 30 of the MEA 3, and supplies the fuel to the fuel diffusing element 30, and is usually called fuel separator. The oxidant distributing element 42 is disposed on an outer side the oxidant diffusing element 34 of the MEA 3, and supplies the oxidant fluid to the oxidant diffusing element 34, and is usually called oxidant separator.

Test Example

Using fuel cells described above, an electric power generation test under various electric power generation conditions was executed. In the electric power generation test, a pure hydrogen gas was used as a fuel, and air was used as an oxidant fluid. In this case, the power generation area of the cell was 20 cm$^2$, the stoichiometric ratio (the oxygen/hydrogen molar ratio) was 5/5, the bubbler temperature was 90° C. at the fuel side and 80° C. at the oxidant side, and the cell temperature was 80° C. The pore diameter in the fuel catalyst layer 31 and the pore diameter in the oxidant catalyst layer 33 were set basically about equal to each other. From the above-described electric power generation test, test results shown in FIGS. 5, 6, 9 and 10 were obtained. In this case, the current density was set at 0.5 ampere/cm$^2$.

Figure 5:
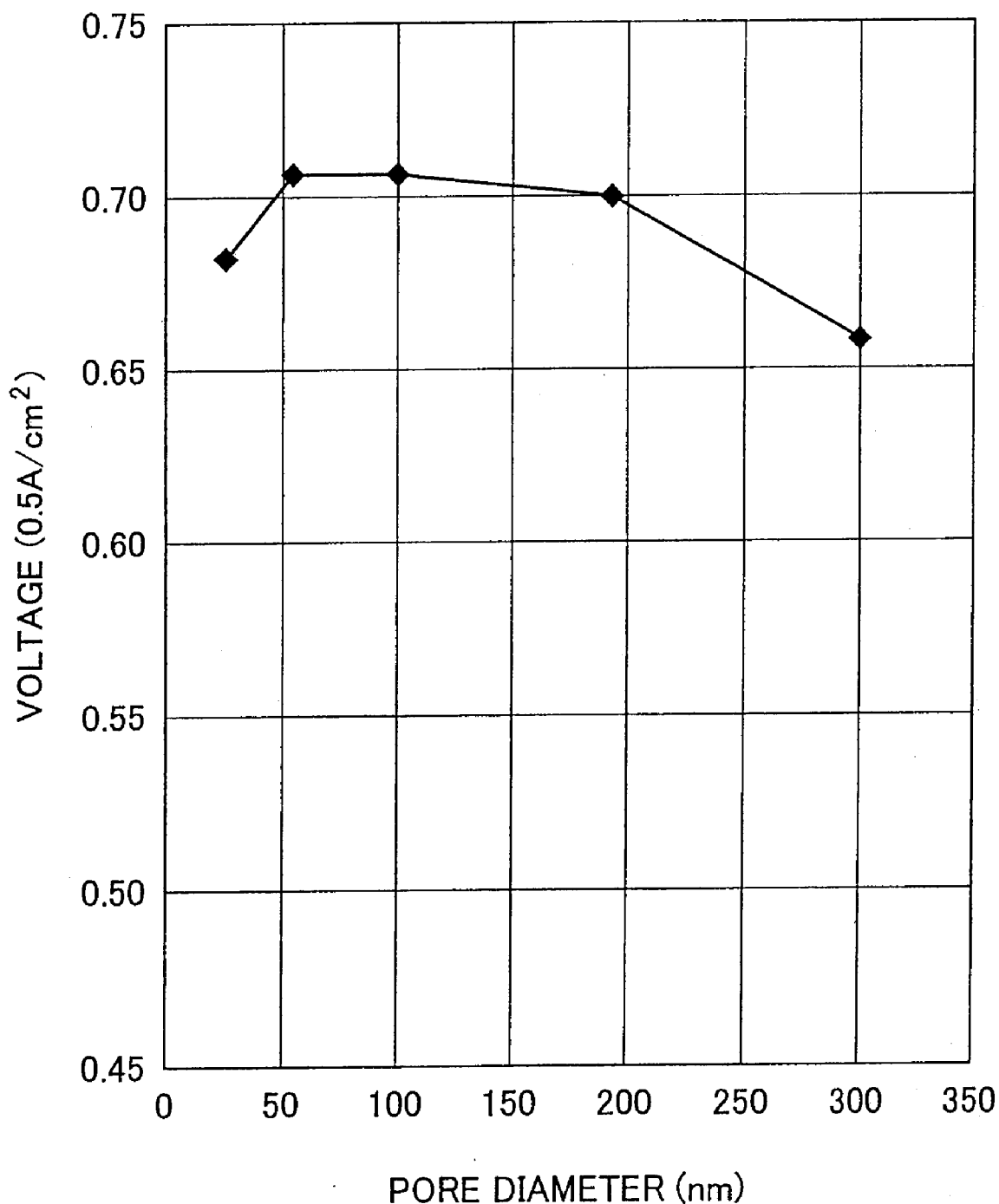
FIG. 5 is a graph showing a relationship between the pore diameter of a agglomerate structure and the voltage.

FIG. 5 shows a relationship between the pore diameter of the agglomerate structure and the generated voltage of the fuel cell in the case where the pore diameter was changed. In this case, there is a critical significance appearing in the relationship between the pore diameter and the generated voltage. The thickness of the polymer was set at 6.5 nanometers. The supported catalyst concentration was set at 30 mass %. The amount of the catalyst per unit area was set at 0.18 mg/cm$^2$. Herein, the pore diameter of the agglomerate structure represents the average value of pore diameters, that is, an average diameter of pore diameters is defined as being the most frequent peak value in the measurement of the pore diameter distribution in the catalyst layer through the use of Palm Porometer (PMI Kabushiki Kaisha), which is a pore diameter measurement device, on the basis of the bubble point method (ASTMF316, JISk3832). The pore diameter means a pore diameter in the state where the polymer is attached to the pore-defining walls.

As shown in FIG. 5, when the pore diameter of the agglomerate structure was 30 to 300 nanometers, the generated voltage was good. In particular, when the pore diameter was 50 to 200 nanometers, 100 to 200 nanometers or 65 to 120 nanometers, the generated voltage was good. Taking the test results shown in FIG. 5 into account, it is inferred that the generated voltage is good in a region of the pore diameter of 40 to 65 nanometers and a region of the pore diameter of 300 to 350 nanometers. As a result, it is inferred that the generated voltage is sufficiently good in the range of the pore diameter of 30 to 350 nanometers.

Figure 3:
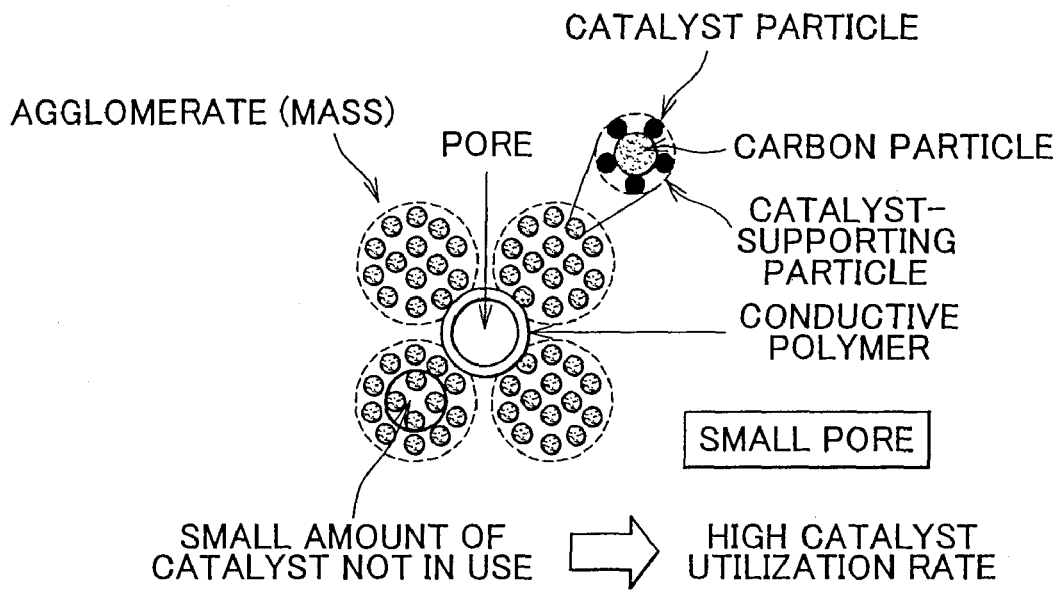
FIG. 3 is a diagram showing the concept of a catalyst structure body for a fuel cell when the size of agglomerates is small.

FIG. 3 shows a conceptual diagram a form in which the agglomerate size is small and the pore diameter is small. In this case, the frequency of the contact between the reactant gas and the catalyst supported on the carbon particles that constitute agglomerates becomes high and the catalyst utilization rate becomes high; however, there is possibility of decline in the passage characteristic of the reactant gas, since the diameter is small. Besides, as for the oxidant electrode, since the pore diameter is small, the water discharge characteristic declines, so that the probability of occurrence of the flooding becomes high. Therefore, in the case where the pore diameter is small, there is a tendency toward decline in the power generation output although the catalyst utilization rate is high.

Figure 4:
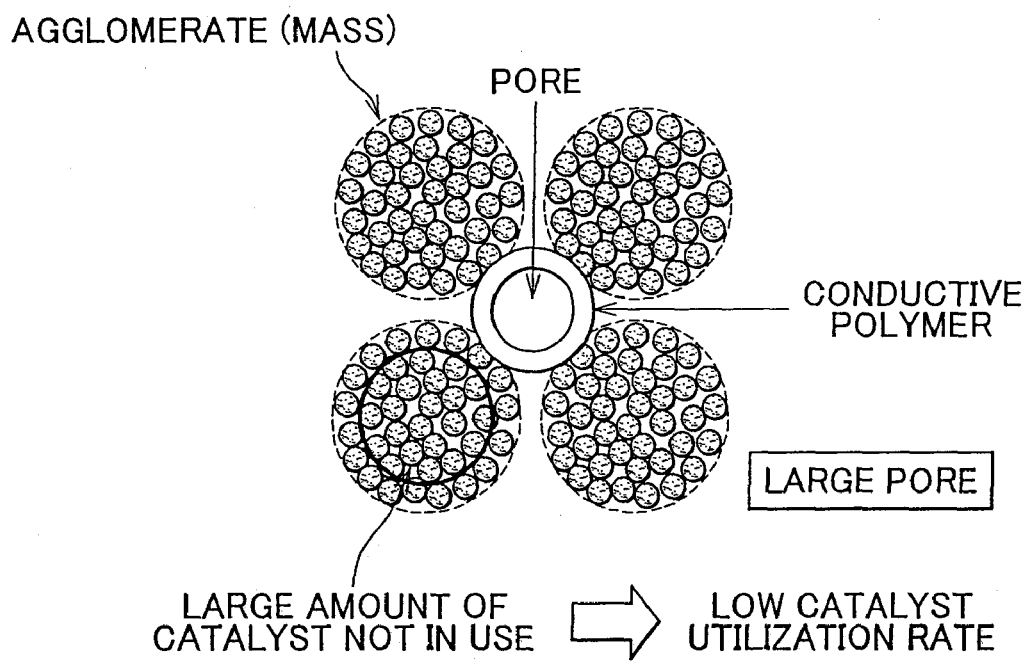
FIG. 4 is a diagram showing the concept of a catalyst structure body for a fuel cell when the size of agglomerates is large.

FIG. 4 shows a conceptual diagram of a form in which the agglomerate size is large and the pore diameter of the agglomerate structure is large. In this case, since the pore diameter is large, there is an expected advantage of heightening the passage characteristic of the reactant gas and of heightening the water discharge characteristic in the case of the oxidant electrode. However, since the size of the agglomerates is large, there is a tendency toward increase in the amount of the catalyst that is less prone to contribute to the electric power generation reaction, in the total amount of the catalyst supported on the carbon particles. In this case, there is tendency toward decline in the catalyst utilization rate and toward decline in the power generation output. In this respect, according to this embodiment, since the pore diameter is appropriate, the passage characteristic of the reactant gas, the water discharge characteristic, and the catalyst utilization rate can be obtained in good balance, which is advantageous in improving the power generation output.

Figure 6:
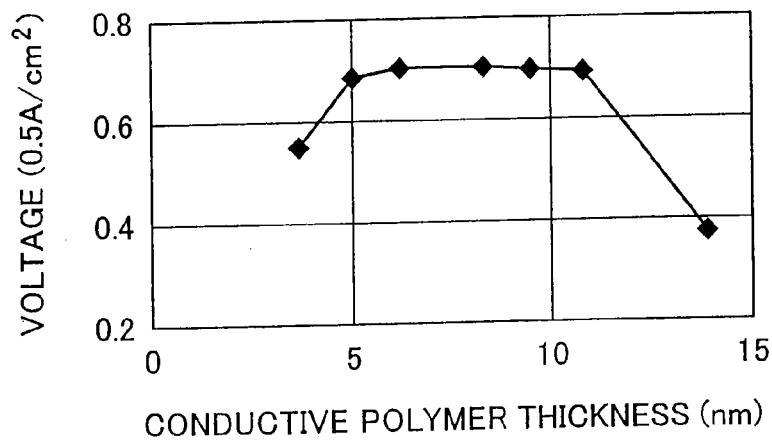
FIG. 6 is a graph showing a relationship between the thickness of a polymer and the voltage.

FIG. 6 shows a relationship between the thickness of the polymer and the generated voltage in the case where the thickness of the polymer was varied. In this case, the pore diameter was set at 65 nanometers. The supported catalyst concentration was set at 30 mass %. The amount of catalyst per unit area was set at 0.18 mg/cm$^2$. According to FIG. 6, there is a significant effect appearing in the relationship between the thickness of the polymer and the generated voltage. If the thickness of the polymer is appropriate, the power generation output is good. However, if the thickness of the polymer is excessively great, there is a tendency toward decline in the power generation output. It is inferred that a cause of this is the decline in the passage characteristic of the reactant gas in the pores. Furthermore, in the case of the oxidant electrode, it is inferred that a cause of the aforementioned tendency is decline in the water discharge characteristic. However, if the thickness of the polymer is excessively thin, there is a tendency toward decline in the proton conductivity and toward decline in the power generation output. Thus, when the pore diameter of the agglomerate structure is set at 65 nanometers, the power generation output is good in the range of 3 to 13 nanometers, or in the range of 3 to 12 nanometers. In particular, in the range of 5 to 8 nanometers, and furthermore, in the range of 5 to 8 nanometers, the power generation output is good.

If the pore diameter of the agglomerate structure is increased to 240 nanometers or 300 nanometers, the volume of the space surrounded by the polymer becomes correspondingly larger, a passage characteristic of the reactant gas and a water discharge characteristic are secured. Therefore, even if the thickness of the polymer should be increased to 20 to 50 nanometers, high power generation output can be obtained. This has been confirmed by tests. Incidentally, where the thickness of the polymer is t and the pore diameter of the agglomerate structure is D, a relationship of $t=D/2\beta$ can be obtained. In this relationship, $\beta$ may be a numerical value in the range of 1 to 12. In particular, $\beta$ can be in the range of 2 to 9. Furthermore, $\beta$ can be in the range of 10 to 30 when the total surface area of the carbon particles is very large.

The thickness t of the polymer present in the pores of the agglomerate structures cannot necessarily be easily measured under electron microscope. Therefore, according to this embodiment, the thickness t of the polymer is found as follows. In each unit area of the catalyst layers 31, 33, the polymer's thickness t (computed value, m)=the polymer's volume ($m^3$)/the polymer's area ($m^2$)≈the polymer's volume ($m^3$)/(the carbon particles' total surface area ($m^2$)×α). In this expression, a means an attachment coefficient that shows the ratio of the attachment of the polymer to the total surface area of the carbon particles. Empirically, α is within the range of 0.2 to 0.7. If α is 0.3, the polymer's thickness $t=183\times10^{-10}$ m$=18.3\times10^{-9}$ m$=18.3$ nanometers.

Catalyst layers in which the mass ratio of nafion to Carbon (ration/C) was changed to a plurality of kinds were formed (N/C=0.45, 1.25). As a result of observation in a section of the catalyst layer under a transmission electron microscope (TEM), it has been recognized that the aforementioned computed values and the aforementioned actually measured values substantially conform to each other.

Figure 7:
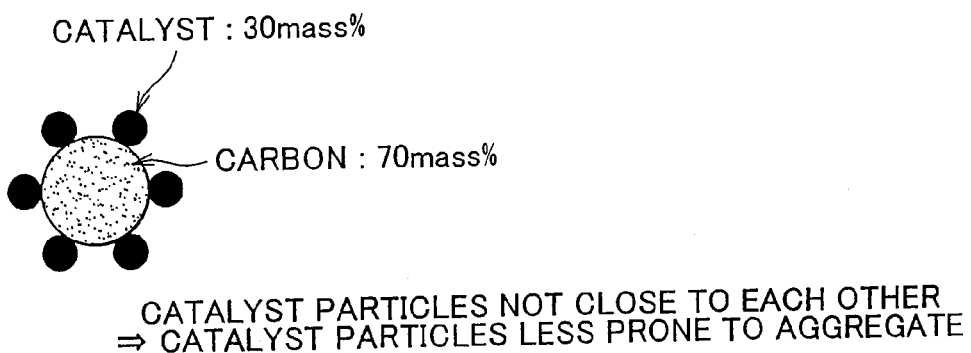
FIG. 7 is a diagram showing a concept of a catalyst-supporting carbon when the supported catalyst concentration is low.
Figure 8:
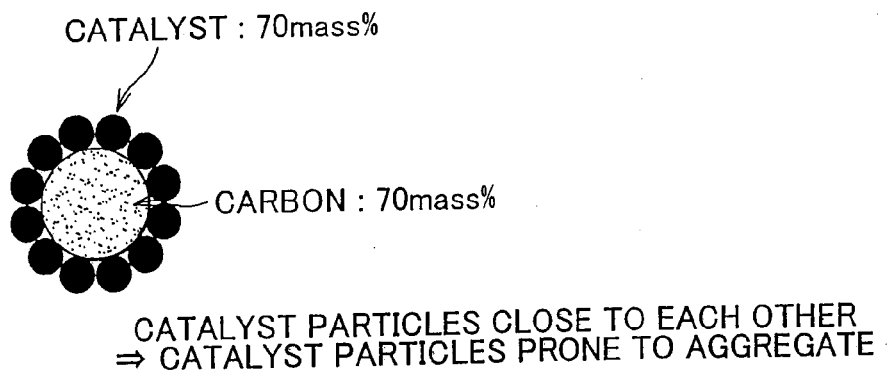
FIG. 8 is a diagram showing a concept of a catalyst-supporting carbon when the supported catalyst concentration is high.

FIGS. 7 and 8 schematically show concepts of catalyst-supporting carbons. As shown in FIG. 7, when the supported catalyst concentration is low (30 mass %), the particles of the catalyst are not in contact with each other, and the catalyst is less likely to aggregate. If the supported catalyst concentration is high, the catalyst effect heightens, so that the power generation output becomes high; however, the cost becomes high as well. Therefore, if the supported catalyst concentration is low, the cost is reduced, but the catalyst effect is reduced, so that the power generation output is expected to decline. On the other hand, as shown in FIG. 8, when the supported catalyst concentration is high (70 mass %), the amount of the catalyst that contributes to the electric power generation reaction increases, so that the power generation output is expected to increase.

Figure 9:
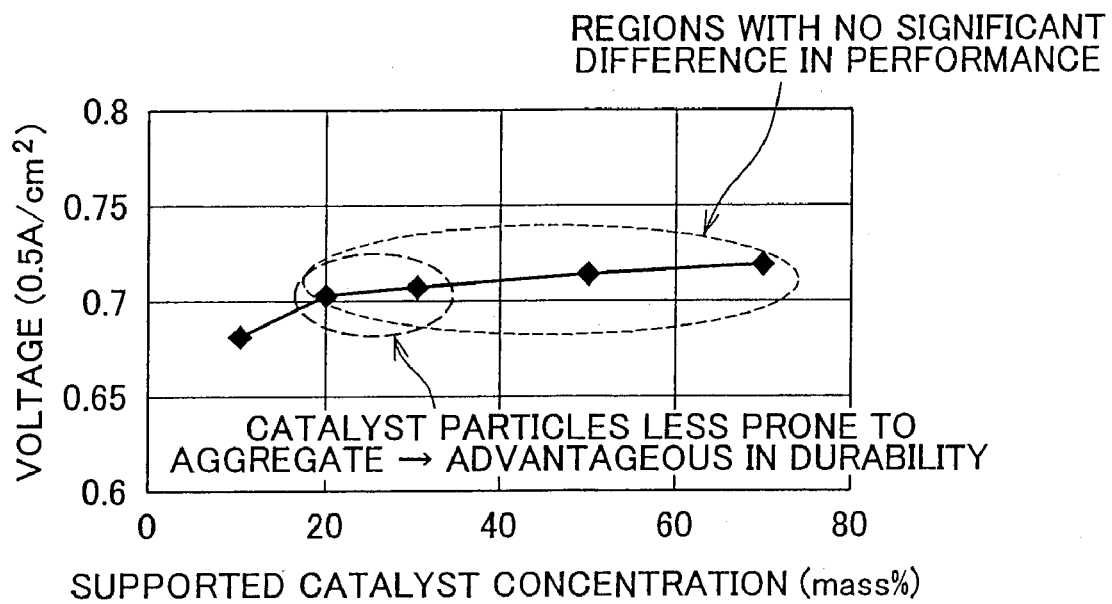
FIG. 9 is a graph showing a relationship between the supported catalyst concentration and the voltage.

FIG. 9 shows a relationship between the supported catalyst concentration and the generated voltage in the case where the supported catalyst concentration was varied, in which the amount of the catalyst-supporting carbon (carbon particle+catalyst) is defined as being 100 mass %. In this case, the pore diameters in the agglomerate structures were set at 65 nanometers. The thickness of the polymer was set at 6.5 nanometers. The amount of the catalyst was set at 0.18 mg/cm². As shown in FIG. 9, it can be understood that good generated voltage is obtained if the supported catalyst concentration is set at 18 to 72 mass %.

As shown in FIG. 9, when the supported catalyst concentration was excessively low (less than 8 mass %), the power generation output declined. However, even when the supported catalyst concentration was relatively low (e.g., 18 to 50 mass %, or 18 to 40 mass %), it was found that the decline in the generated voltage was small, high generated voltage was favorably maintained substantially the same as in the case where the supported catalyst concentration was high. That is, this embodiment achieves an advantage of the power generation output being less prone to decline even if the amount of the catalyst is reduced. It is inferred that since the thickness t of the polymer and the size of the pore diameter are appropriate in value, the influence of the decline in the supported catalyst concentration is reduced. Therefore, in view of restraining the decline of the catalyst utilization rate and securing a durability as well as securing of a power generation output, it is more preferable to lower the supported catalyst concentration.

Considering the result shown in FIG. 9, according to this embodiment, the upper limit value of the supported catalyst concentration can be lowered while high power generation output is secured. Thus, the embodiment is advantageous in cost reduction. Furthermore, in the case where the supported catalyst concentration on the catalyst-supporting carbon is high, the large amount of catalyst particles facilitates the contact between catalysts, so that as the power generation operation lengthens, catalyst particles aggregate to increased sizes, and therefore, decline in the utilization rate of the catalyst or decline of the durability of the catalyst may be induced. In conjunction with this respect, according to this embodiment, the supported catalyst concentration can be lowered. Therefore, the aggregation of catalyst particles is restrained, and the tendency toward coarser and larger particles of the catalyst is restrained. Thus, the embodiment is advantageous in improving the durability and the service life of the catalyst. Taking these circumstances into account, the supported catalyst concentration can be set in the range of 18 to 60 mass %, 18 to 50 mass %, 18 to 40 mass % or 18 to 32 mass %.

Incidentally, if the supported catalyst concentration is low, the proportion of the carbon particle becomes higher than that of the catalyst, so that there is a tendency toward higher viscosities of the mixture and toward increase in the pore diameter of the agglomerate structure. Therefore, in the case where the supported catalyst concentration is set low, the increase in the pore diameter of the agglomerate structure may be restrained by adjusting the amounts of liquid materials, such as water, a solvent, a dispersion medium, etc., which are compounded into the mixture.

Figure 10:
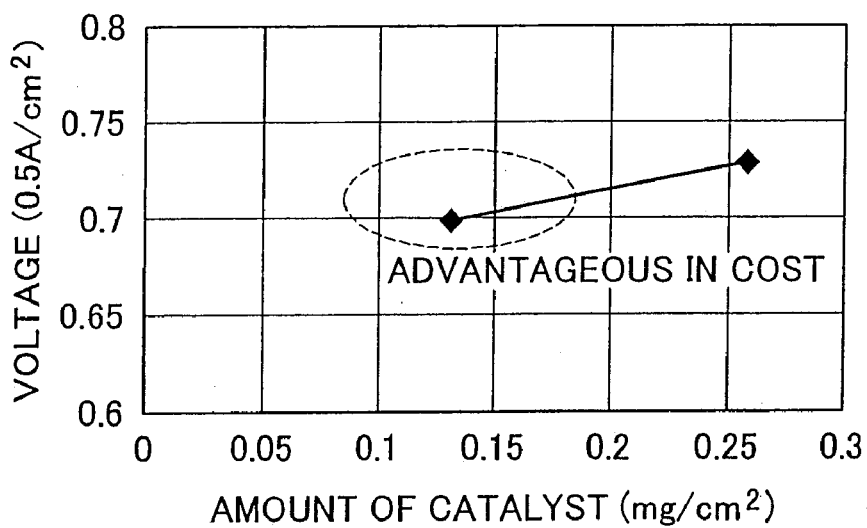
FIG. 10 is a graph showing a relationship between the amount of catalyst and the voltage per unit area.

Generally, if the amount of the catalyst used is increased, a tendency toward higher power generation outputs is recognized; however, the cost becomes higher. FIG. 10 shows a relationship between the generated voltage and the amount of the catalyst used (not including the mass of the carbon particles) per unit area (1 cm²) of the catalyst layer (the fuel catalyst layer 31, the oxidant catalyst layer 33) in the case where the amount of the catalyst used was varied. In this case, the supported catalyst concentration was set at 30 mass %. The pore diameter in the agglomerate structure was set at 100 nanometers. The thickness of the polymer was set at 6.5 nanometers.

As shown in FIG. 10, a tendency of the generated voltage becoming lower with decreases in the amount of the catalyst used for accelerating the electric power generating reaction is recognized. However, this embodiment achieves an advantage of the power generation output being less prone to decline when the amount of the catalyst is reduced. Therefore, even if the amount of the catalyst used is considerably low (0.25 mg/cm² or less), the amount of decline in the power generation output is small, and high power generation output can still be obtained. With regard to this, it is inferred that the thickness t of the polymer is appropriate in value and the pore diameter is also appropriate in value, so that the decline in the power generation output is restrained.

Therefore, in view of achieving high power generation output and reducing the cost, the amount of the catalyst used in the catalyst layer can be set relatively low. Specifically, the amount of the catalyst used per unit area (1 cm²) of the catalyst layer may be set at 0.04 to 0.36 mg/cm², or 0.04 to 0.25 mg/cm², and, furthermore, may also be set at 0.08 to 0.18 mg/cm². The upper limit value of the amount of the catalyst used may be set, for example, at 0.36 mg/cm², 0.25 mg/cm², 0.20 mg/cm², 0.18 mg/cm², or 0.15 mg/cm².

A result was obtained that, when the amount of the catalyst was 0.08 to 0.18 mg/cm², the power generation output was not considerably low, in comparison in the I-V characteristic with when the amount of the catalyst was 0.30 mg/cm². Concretely, as shown in FIG. 10, a result indicating that although the amount of the catalyst is reduced from the 0.26 mg/cm² to 0.13 mg/cm², the decline in the voltage can be restrained to about 30 millivolts. Therefore, the amount of the catalyst can be set at 0.08 to 0.18 mg/cm², in order to reduce the cost while maintaining a quite high power generation output.

Embodiment 2

Embodiment 2 is basically the same in manufacture process, construction, and effects as Embodiment 1, and enhances the power generation output while reducing the amount of the catalyst used. However, the pore diameter Da of the catalyst structure bodies in the fuel catalyst layer 31 and the pore diameter Dc of the catalyst structure bodies in the oxidant catalyst layer 33 are set so that Da<Dc. The pore diameter Da is set in the range of 65 to 120 nanometers. The pore diameter Dc is set in the range of Dc=Da×(1.05 to 1.5). Due to the relationship of Da<Dc, the produced water discharge characteristic of the oxidant catalyst layer 33 can be heightened, and the flooding resistance can be heightened. As for the thickness of the polymer of the pores, the thickness ta of the polymer in the fuel catalyst layer 31 and the thickness tc of the polymer in the oxidant catalyst layer 33 are set so that ta<tc corresponding to Da<Dc. Incidentally, Da and Dc are not limited to the aforementioned values.

Embodiment 3

Embodiment 3 is basically the same in manufacture process, construction, and effects as Embodiments 1 and 2. However, the pore diameter Da of the catalyst structure bodies in the fuel catalyst layer 31 and the pore diameter Dc of the catalyst structure bodies in the oxidant catalyst layer 33 are set so that Da<Dc. While the relationship of Da<Dc is maintained, Da is set in the range of 50 to 100 nanometers and Dc is set in the range of 120 to 240 nanometers. Due to the relationship of Da<Dc, the produced water discharge characteristic of the oxidant catalyst layer 33 can be heightened. As for the thickness of the polymer of the pores, the thickness ta of the polymer in the fuel catalyst layer 31 and the thickness tc of the polymer in the oxidant catalyst layer 33 are set so that ta≈tc. This embodiment can also secure a power generation output while reducing the amount of the catalyst, similarly to Embodiments 1 and 2. Incidentally, Da and Dc are not limited to the aforementioned values.

Other Modifications

Although according to Embodiment 1, the ultrasonic operation, the cooling operation and the stirring operation are executed in that order, this is not restrictive; for example, the operations can be executed in the order of the cooling operation, the ultrasonic operation and the stirring operation. The operations may also be executed in the order of the stirring operation, the ultrasonic operation and the cooling operation. The operations may also be executed in the order of the stirring operation, the cooling operation and the ultrasonic operation. Although according to Embodiment 1, both the fuel catalyst layer 31 and the oxidant diffusing element 34 are formed of the catalyst structure bodies in accordance with the invention, this is not restrictive, and it is permissible that either one of them be formed of the catalyst structure bodies in accordance with the invention. The invention is not limited only to the embodiments and the like described above or shown in the drawing, but may also be carried out with appropriate modifications, without departing from the spirit of the invention. From the foregoing description, the following technical idea can be grasped.

The invention claimed is:

1. A catalyst structure body for a fuel cell, comprising:
   (i) an agglomerate structure in which agglomerates each formed by aggregation of a catalyst-supporting carbon in which a catalyst is supported on a surface of a carbon support, are gathered so as to form a pore between the agglomerates; and
   (ii) a proton-conductive polymer which enters the interior of the pore between the agglomerates in the agglomerate structure,
   wherein an average thickness of the proton-conductive polymer present in the pore is set at 3 to 50 nanometers, and
   wherein an average pore diameter of the pores in a state where the proton-conductive polymer is attached is set at 40 to 350 nanometers, and
   wherein a supported catalyst concentration in the catalyst-supporting carbon is set at 18% to 40% by mass provided that a mass of the catalyst-supporting carbon is defined as being 100%.

2. The catalyst structure body according to claim 1, wherein the average thickness of the proton-conductive polymer present in the pore is set 3 to 13 nanometers.

3. The catalyst structure body according to claim 2, wherein the average thickness of the proton-conductive polymer present in the pore is set to 3 to 12 nanometers.

4. The catalyst structure body according to claim 2, wherein the average thickness of the proton-conductive polymer present in the pore is set to 5 to 10 nanometers.

5. The catalyst structure body according to claim 1, wherein the average pore diameter of the pores in a state where the proton-conductive polymer is attached is set to 50 to 200 nanometers.

6. The catalyst structure body, according to claim 1, wherein the average thickness of the proton-conductive polymer is set so as to have a relationship of $t=D/2\beta$, where t is the average thickness in nanometer, D is an average pore diameter of the pores in nanometer, and $\beta$ is a numerical value in a range of 1 to 12.

7. The catalyst structure body, according to claim 1, wherein the average thickness of the proton-conductive polymer is represented by a volume of the proton-conductive polymer/(a total surface area of the carbon support×α), where α means a proportion of a surface area of the carbon support to which the proton-conductive polymer is attached relative to the total surface area of the carbon support.

8. The catalyst structure body according to claim 7, wherein the α is set at 0.2 to 0.7.

9. A membrane-electrode assembly which is formed by stacking a fuel diffusing element, a fuel catalyst layer, a membrane of a proton-conductive polymer, an oxidant catalyst layer, and an oxidant diffusing element sequentially in a thickness direction, wherein at least one of the fuel catalyst layer and the oxidant catalyst layer includes the catalyst structure body, according to claim 1.

10. The membrane-electrode assembly according to claim 9, wherein an amount of the catalyst per unit area of at least one of the fuel catalyst layer and the oxidant catalyst layer is set at 0.01 to 0.45 mg/cm$^2$.

11. The membrane-electrode assembly according to claim 10, wherein the amount of the catalyst per unit area is set at 0.08 to 0.18 mg/cm$^2$.

12. The membrane-electrode assembly according to claim 9, wherein Da<Dc is set, where Da is an average pore diameter of the catalyst structure bodies in the fuel catalyst layer, and Dc is an average pore diameter of the catalyst structure bodies in the oxidant catalyst layer.

13. The membrane-electrode assembly according to claim 9, wherein ta<tc is set, where to is the average thickness of the proton-conductive polymer in the fuel catalyst layer, and tc is the average thickness of the proton-conductive polymer in the oxidant catalyst layer.

14. A fuel cell comprising:
   (i) a membrane-electrode assembly formed by stacking a fuel diffusing element, a fuel catalyst layer, a membrane formed from a polymer having proton conductivity, an oxidant catalyst layer, and an oxidant diffusing element, sequentially in an average thickness direction;
   (ii) a fuel distributing element disposed facing the fuel diffusing element of the membrane-electrode assembly; and
   (iii) an oxidant distributing element disposed facing the oxidant diffusing element of the membrane electrode assembly,
   wherein at least one of the fuel catalyst layer and the oxidant catalyst layer includes the catalyst structure body according to claim 1.

15. A manufacture method for a catalyst structure body for a fuel cell, comprising:
   forming a mixture whose main components are a catalyst-supporting carbon in which a catalyst is supported on a surface of a carbon support, a proton-conductive polymer, and a liquid material; and
   executing each of an ultrasonic operation of applying ultrasonic vibration to the mixture, a cooling operation of cooling the mixture, and a stirring operation of stirring the mixture, at least once respectively for each operation,
   wherein an operation cycle that includes the ultrasonic operation, the cooling operation and the stirring operation is performed 2 to 100 times, and
   wherein relative mass amounts of the main components are within the following ranges: catalyst 0.3 to 0.6; carbon support 0.4 to 0.8; polymer 0.4 to 0.7; and liquid material 8 to 18.

16. The manufacture method according to claim 15, wherein the operation cycle is performed 2 to 7 times.

17. The manufacture method according to claim 15, wherein the operation cycle is performed 25 to 35 times.

18. The manufacture method for a catalyst structure body for a fuel cell, according to claim 15, wherein a frequency of an ultrasonic wave in the ultrasonic operation is 5 kHz to 200 kHz.

19. The manufacture method for a catalyst structure body for a fuel cell, according to claim 15, wherein a temperature to which the mixture is cooled in the cooling operation is 0 to 40° C.

20. A manufacture method of a catalyst layer for a fuel cell, comprising:
   forming a coating material that contains a catalyst structure body manufactured by the manufacture method according to claim 15;
   forming a coating layer by coating the coating material to a surface of a membrane or a diffusing element; and
   drying the coating layer.

* * * * *